US006963687B2

(12) United States Patent
Vergeest et al.

(10) Patent No.: US 6,963,687 B2
(45) Date of Patent: Nov. 8, 2005

(54) PROCESS FOR CUTTING AN OPTICAL FIBER

(75) Inventors: Henricus Jozef Vergeest, 's-Hertogenbosch (NL); Antonius Petrus Cornelis Maria Hultermans, Tilburg (NL); Pieter Stroobach, Eindhoven (NL)

(73) Assignee: The Whitaker Corporation, Wilmington, DE (US)

( * ) Notice: Subject to any disclaimer, the term of this patent is extended or adjusted under 35 U.S.C. 154(b) by 405 days.

(21) Appl. No.: 09/880,698

(22) Filed: Jun. 12, 2001

(65) Prior Publication Data

US 2003/0205562 A1    Nov. 6, 2003

Related U.S. Application Data

(63) Continuation-in-part of application No. 09/395,352, filed on Sep. 14, 1999, now Pat. No. 6,246,026.

(60) Provisional application No. 60/229,787, filed on Sep. 1, 2000.

(30) Foreign Application Priority Data

Sep. 18, 1998  (EP) .................................. 98117698

(51) Int. Cl.$^7$ .............................................. G02B 6/02
(52) U.S. Cl. ..................................... 385/123; 385/115
(58) Field of Search ....................... 385/123, 115, 134, 385/137, 147

(56) References Cited

U.S. PATENT DOCUMENTS

| 4,158,555 | A | * | 6/1979 | Kallenborn ................... 65/441 |
| 5,395,025 | A | * | 3/1995 | Borer et al. .................... 225/2 |
| 5,471,335 | A | * | 11/1995 | Nitta .......................... 398/160 |
| 5,521,754 | A | * | 5/1996 | Nitta et al. .................. 359/344 |
| 5,842,622 | A | * | 12/1998 | Mansfield et al. .......... 225/96.5 |
| 6,087,624 | A | * | 7/2000 | Brown ................... 219/121.72 |
| 6,724,959 | B1 | * | 4/2004 | Takahashi et al. ............. 385/33 |

FOREIGN PATENT DOCUMENTS

| EP |     391598 A1 | 10/1990 | ..................... 37/15 |
| JP |     54030590  |  3/1979 | ....................... 3/14 |
| JP |     54030590 A | * 3/1979 | ............. B26F 3/14 |
| JP |    403154011 A | * 7/1991 | ............ G02B 6/28 |
| JP |   4052355504 A | * 9/1993 | ................... 65/112 |
| JP |    405341135 A | * 12/1993 | ............ G02B 6/00 |

OTHER PUBLICATIONS

Official Traslation copy ofKinoshita et al. (JP 354030590A), Mar. 2004, (PN 54-030590).*
Webster's II, New College Dictionary, 1995, page having the word "sublimation".*

* cited by examiner

*Primary Examiner*—Kianni Kaveh

(57) ABSTRACT

A process for cutting or splitting at least one optical fiber at a predetermined angle, wherein the fiber is introduced into a holding and positioning device and is cut by a pulsed laser beam.

6 Claims, 7 Drawing Sheets

PROCESS FOR CUTTING AN OPTICAL FIBER

REFERENCE TO RELATED APPLICATIONS

This application is a continuation in part of application Ser. No. 09/395,352, filed on Sep. 14, 1999 U.S. Pat. No. 6,246,026, and claims priority to provisional application No. 60/229,787 filed on Sep. 1, 2000. These applications are incorporated herein by reference in their entirety.

FIELD OF THE INVENTION

The invention relates to cutting one or more fibers to form angled or shaped end faces that require no polishing.

BACKGROUND OF THE INVENTION

Optical fibers made of glass are often used in optical transmission systems and other optical systems. The machining of the end face of these fibers plays a crucial role during the use of these monomode or multimode fibers. It is important that the end faces have a particularly uniform surface so that the transition from one fiber end to another or to an active element can be carried out with damping values which are as low as possible. It is also important that the end faces of the fibers can be produced at predetermined angles and that these angles are reliable and reproducible.

Various mechanical processes are currently known for severing optical fibers. With these processes, the fiber is typically fixed in a holding device consisting of two holders which are then mutually offset, for example, so that the correct angle is ensured during the cutting operation (see, e.g., EP 351,225.) To effect the cut, a tradition cleaving mechanism such as a diamond cutter is used. It is also known to twist the fiber or begin to cut and then break the fibers along the partial cut. After the fiber is cut, its end face is then polished to minimize optical losses.

The mechanical approach of cleaving and polishing a fiber has a number of significant shortcomings. For example, the multiple steps required makes this approach time-consuming, and, thus, expensive. The approach of mechanically cleaving and polishing a fiber also tends to be limited in flexibility. For example, ribbon cable can be cut only under limited conditions. Furthermore, the angle of the end face of a fiber is generally limited to less than 15° due to the excessive forces the polishing pad imparts to the fiber as the angle increases. As used herein, the phrases "angle of the end face" and "end face angle" refer to the angle from a perpendicular of the optical axis of the fiber. As the end face angle increases, the axial force component of the pad on the fiber increases. Glass fiber tends to lack axial strength. At some point, the axial force component, in combination with the torsional force component, causes the fiber tip to fracture. Although this point various depending upon the polishing technique, the end face angle is generally below 15°.

Therefore, there is a need for preparing the end face of a glass fiber which is inexpensive, versatile, and not limited to certain end face geometries. The present invention fulfills this need among others.

SUMMARY OF THE INVENTION

The present invention provides an approach for preparing the end face of a fiber which avoids the shortcomings of the prior art by using a laser to cut and polish the end face simultaneously. According to the present invention, the fiber is held in a holding and positioning device and the fiber is then cut or machined by means of a laser beam moving relative to the fiber. As a result, a fiber end face can be prepared accurately with a predetermined angle or shape and with surface uniformity such that additional machining of the fiber end face is unnecessary.

For example, in a simple configuration, the laser cuts a straight path across the fiber to form a planar end face. The planar end face may be normal to the axis of the fiber, or, in a preferred embodiment, it may be angled to the axis such that the end face of the fiber serves to change the direction of the light exiting or entering the fiber. With respect to this preferred embodiment, since there is no polishing required, the end face may be cut at an angle greater than 15°. It has been found that an end face at such an angle, preferably about 45°, may be used to optically couple the fiber to a device which is not along the fiber's optical path due to its ability to alter the direction of light. Such a light bending technique may be preferable in many optical subassemblies, including, for example, a subassembly comprising a ribbon cable optically coupled to an array of VCSELs in which the vertical operative axes of the VCSELs are perpendicular to the optical axes of the fibers of the ribbon cable.

Laser cleaving also provides for complex cuts and end face whereas former mechanical systems were relegated to just straight cuts. Since the movement of a laser across the fiber is not limited to simple, straight paths and since no polishing is required, any end geometry is possible with the present invention. For example, the fiber end face may be multifaceted or curved to enhance the optical coupling performance of the fiber. A preferred end face shape includes a wedge shape formed by two opposing cuts. In practice, the wedge shaped will tend to be blunted due to surface tension of the softened fiber during cutting. The blunted wedge shape therefore acts a cylinder-type lens at the fiber end. Such a configuration is well suited for optically coupling the fiber with a laser having an elliptical beam.

Aside from just complex end face geometries, the present invention also provides for the end shaping of individual fibers in a ribbon cable. In one particular preferred embodiment, the laser is used to cut each fiber of a ribbon cable at an angle other than perpendicular to the optical axis, thus, achieving a saw tooth configuration. In another preferred embodiment, the fibers of a ribbon cable which is to be optically coupled to a waveguide or other device are configured as they would be in the device, for example, fanned out, and then each is laser cut to the desired end face angle. Thus, a complex arrangement, in which each fiber of the ribbon cable must be cut at a different angle and/or to a different length due to the fibers fanning out, is made easy.

Aside from the flexibility offered by the approach of the present invention in preparing fibers of any desired end face geometry, the laser's sublimatation of the glass, rather than a mechanical cut, offers a number of advantages and distinctions over the prior art. For example, ablation of the glass, as opposed to mechanical cleaving, provides for a smooth end face which generally requires little if any subsequent polishing. Furthermore, a laser cut end face tends to have rounded edges rather than sharp edges. This rounding occurs because the fiber material becomes somewhat molten in the vicinity adjacent the cut, and the surface tension of the glass pulls across the edge, thereby causing the edge to flatten or become rounded. On the other hand, the end face of a polished fiber has sharp edges since the fiber does not become fluid during the polishing step to the extent that the surface tension of the fiber material has any significant effect. Such differences in end face geometry are significant. For example, the rounded edges formed by laser cleaving are better suited for V-groove alignment applications since the rounded edges glide along the V-groove rather than schriving it as a sharp edge might and potentially creating debris in the optical path.

The present invention is also able to prepare an end face with unprecedented accuracy and precession. For example, whereas former mechanical systems have typical angle tolerances of +/−0.5 μm, angle tolerances of less than +/−0.2 μm can be achieved with the process according to the invention. Additionally, the present invention offers a high degree of control over the position of the cleaved end face relative to a reference point. For example, it has been observed that a tolerance of less than +/−10 μm is achievable. Furthermore, it has been observed that the laser can cleave within 1 mm of the fiber coating with suitable results.

BRIEF DESCRIPTION OF THE DRAWINGS

FIG. 8 shows a silicon wafer board having V-grooves for aligning fibers of a ribbon cable with an active component mounted thereon.

DETAILED DESCRIPTION OF PREFERRED EMBODIMENT

Figure 1:
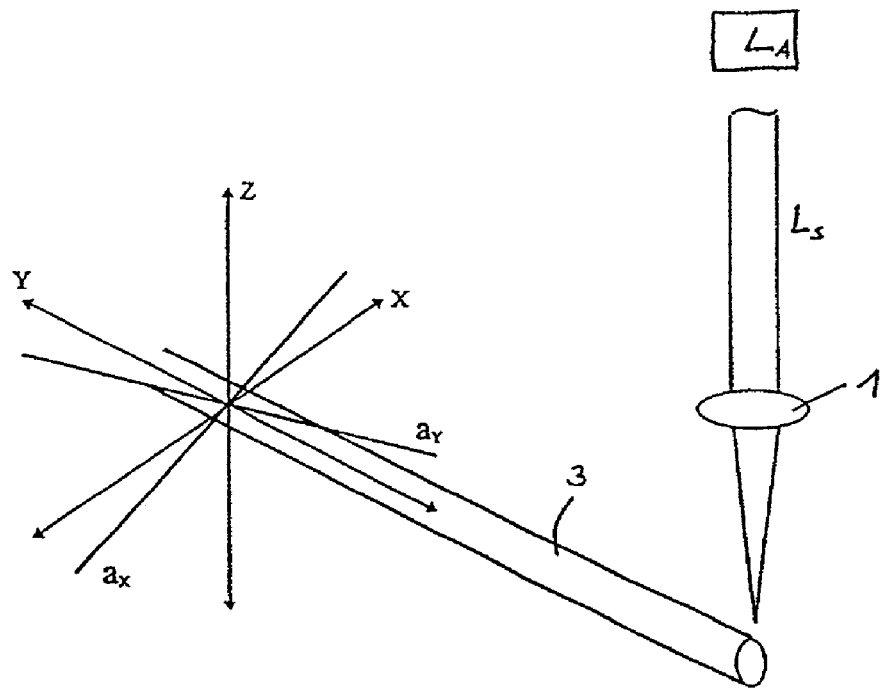
FIG. 1 is a schematic view of an optical waveguide with a coordinate system and a laser beam.
Figure 2:
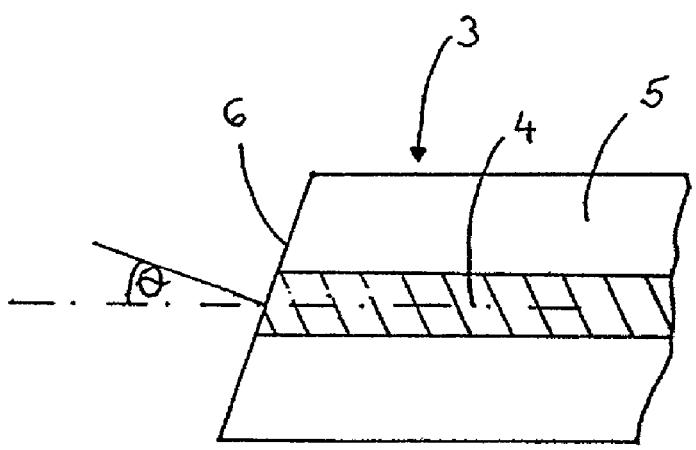
FIG. 2 is a cross section through one end of an optical waveguide.

Referring to FIG. 1, a laser $L_A$ from which a laser beam $L_S$ issues is initially required for carrying out the process of cutting a fiber 3. The optical fiber 3 is a glass fiber, for example a monomode or multimode fiber. As shown in FIG. 2, the fiber 3 consists of a fiber core 4 and a fiber sheath 5 so that the light is guided substantially in the fiber core 4.

In general, any laser with a wavelength between 0.1 and 1.5 μm and 8.5 μm to 10 μm can be used for producing the beam for cleaving the fibers. Suitable lasers include, for example, $CO_2$ and excimer lasers, although a $CO_2$ laser is preferred. $CO_2$ lasers have proven particularly advantageous due to the high speed at which they can operate and their resultant cost effectiveness. The fiber material is removed by ablation by the $CO_2$ laser during the cutting process, such that, rather than melting, the glass is sublimated.

Balancing the objective of delivery high energy to fiber to ablate the glass is the need to minimize the energy absorbed by the glass surrounding the cut so as to minimize melting. For this reason, the $CO_2$ laser is operated preferably in a pulsed mode for cutting the fiber, although it may be preferable for other types of lasers, or even the $CO_2$ laser, to be operated in a continuous wave mode. (For example, if time the laser impinges the fiber is decreased, i.e., the laser cuts across the fiber more quickly, it may be desirable to operate the laser in continuous wave mode.) In the pulse mode, the laser transmits short high-energy pulses of laser light so that the material of the fiber is sublimated. The pulses are very short and have very steep edges, thus, the maximum pulse energy is achieved very rapidly. For example, suitable results have been achieved in which the peak power of the pulse is between about 0.1 and about 1000 watts and the pulse length is greater than about 50 fs. Very good results are achieved with a $CO_2$ laser (wavelength 10.6 μm) having a pulse length of 35 μs and a peak power of 600 watts.

The fiber 3 is arranged in a holding and positioning device and is positionable relative to the laser $L_A$. Preferably, the device is configured to move the fiber at one or more predetermined angles relative to the laser beam, although it is within the scope of the present invention to move the laser beam relative to the fiber. In one embodiment, the fiber may be oriented along the axis $a_Y$ and then be moved along the axis X relative to the laser beam $L_S$. using microtranslators on the holding and positioning device. However, it is also possible for microtranslators of the holding and positioning device to move the fiber 3 along the axis $a_X$ or any other angle or combination of angles and curves relative to the laser beam.

The laser beam $L_S$ is concentrated by a lens 1. The laser beam $L_S$, once concentrated in this way, impinges on the optical fiber 3. As shown in FIG. 2, a surface 6 of the fiber 3 is produced at an inclination angle to the fiber axis. The angle of inclination can be accurately reproducible. Furthermore, a very accurate and high quality surface of the fiber is achieved by "laser cutting," so additional machining of the fiber surface after cutting, as is normal with mechanical cutting processes, is no longer necessary. In other words, the fiber end face 6 is finished sufficiently after cutting with the laser.

Figure 3:
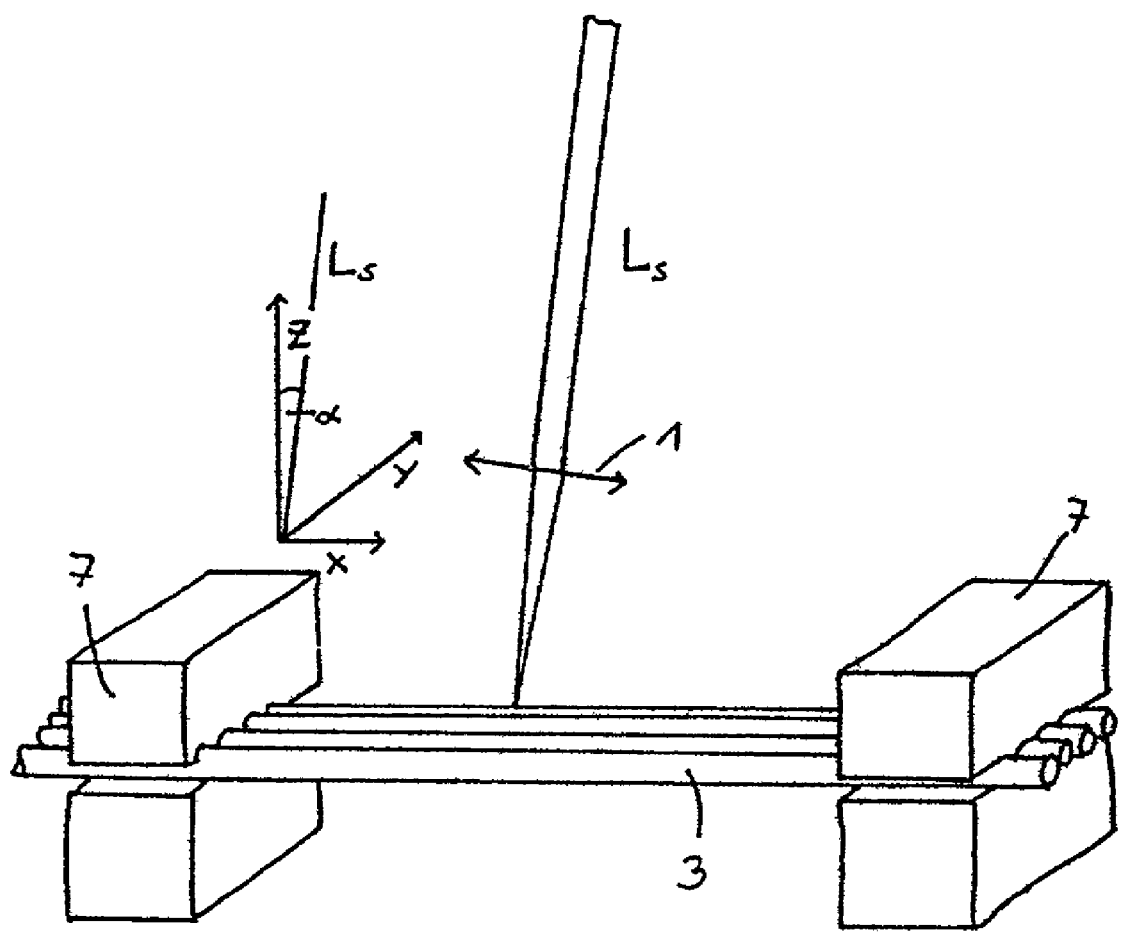
FIG. 3 is a schematic view of optical waveguides of a ribbon cable fastened in a holding and positioning device.

As shown in FIG. 3, with the process according to the invention, it is possible to cut not only an individual fiber and adequately finish the end surface at the same time, but also a bundle of fibers 3 oriented parallel to one another (for example, a ribbon cable) simultaneously with the same surface qualities. For this purpose, the fibers 3 that make up a bundle are introduced into a positioning device 7. The positioning device 7 ensures that the fibers 3 are arranged parallel to one another. The longitudinal axis of the fibers 3 coincides, for example, with the X-axis of a coordinate system. The positioning device 7 can now be driven along the direction of the Y-axis in a manner that ensures that the fibers 3 remain in parallel orientation.

The laser beam $L_S$, which in this embodiment is inclined by an angle α to the Z-axis, is concentrated onto the fibers 3 by means of a lens 1 and operated in a mode with short high-energy pulses described above. The fibers 3 pass through the laser beam $L_S$ and are thus cut and the end faces simultaneously finished. Advantageously, this process ensures that all fibers of the ribbon cable are cut at the same angle with an equally high end face quality.

Figure 4:
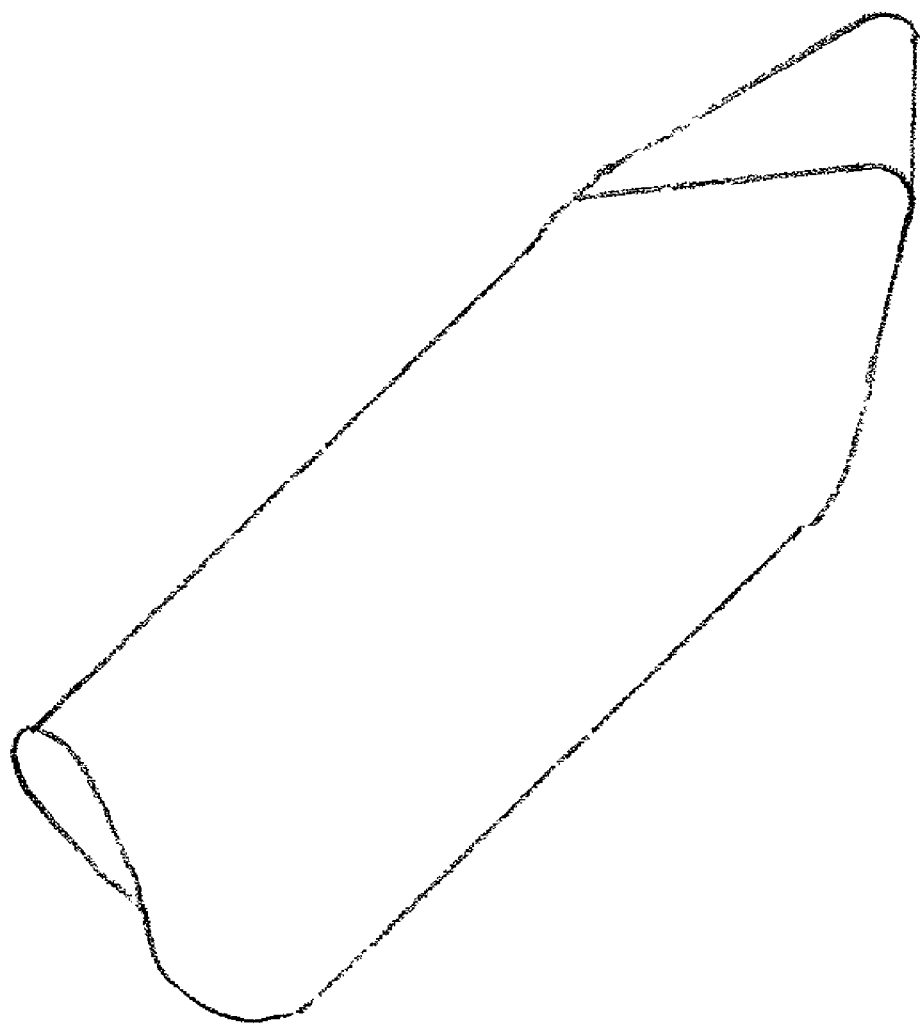
FIG. 4 is a schematic view of a wedged-shaped end of a fiber prepared using the laser cleaving of the present invention.
Figure 5:
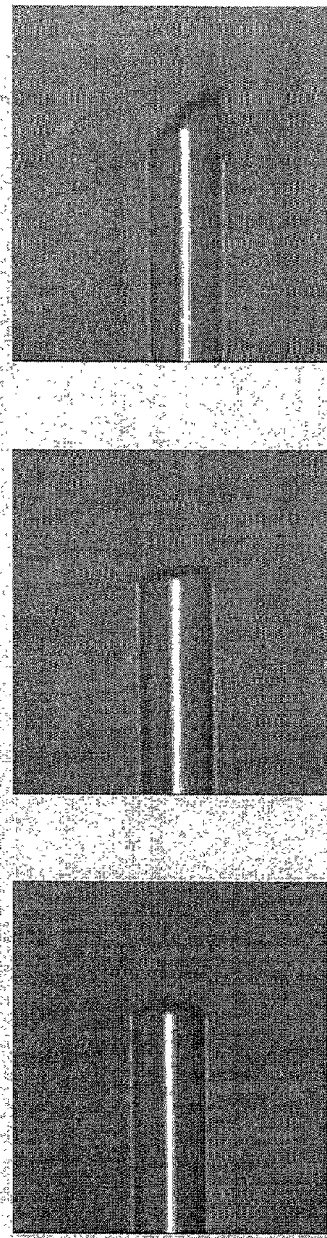
FIG. 5 is a photograph showing fibers having different end face angles.

As mentioned before, the present invention is able to prepare an end face of a fiber with any desired geometry. Referring to FIGS. 5a–c, a fiber 51 is shown with different an end face 53, 54, 55 of 0°, 8° and 45°, respectively. Noteworthy is the rounded edge 52 of fiber 1 which is a distinction over mechanically cleaved and polished fibers. Furthermore, as shown in FIG. 4, laser cleaving of the present invention can be used to form a wedged-shaped fiber end 41. This wedge shape was formed by passing the fiber through the laser beam at different angles. The wedge shaped fiber end 41 is slightly blunted presumably due to surface tension of the softened fiber during laser ablation. The blunted wedge shape therefore presents a cylinder-type lens 42 at the fiber end. Such a configuration is well suited for optically coupling the fiber with pump-type lasers or other devices which emit or receive an elliptical beam of light.

Figure 6:
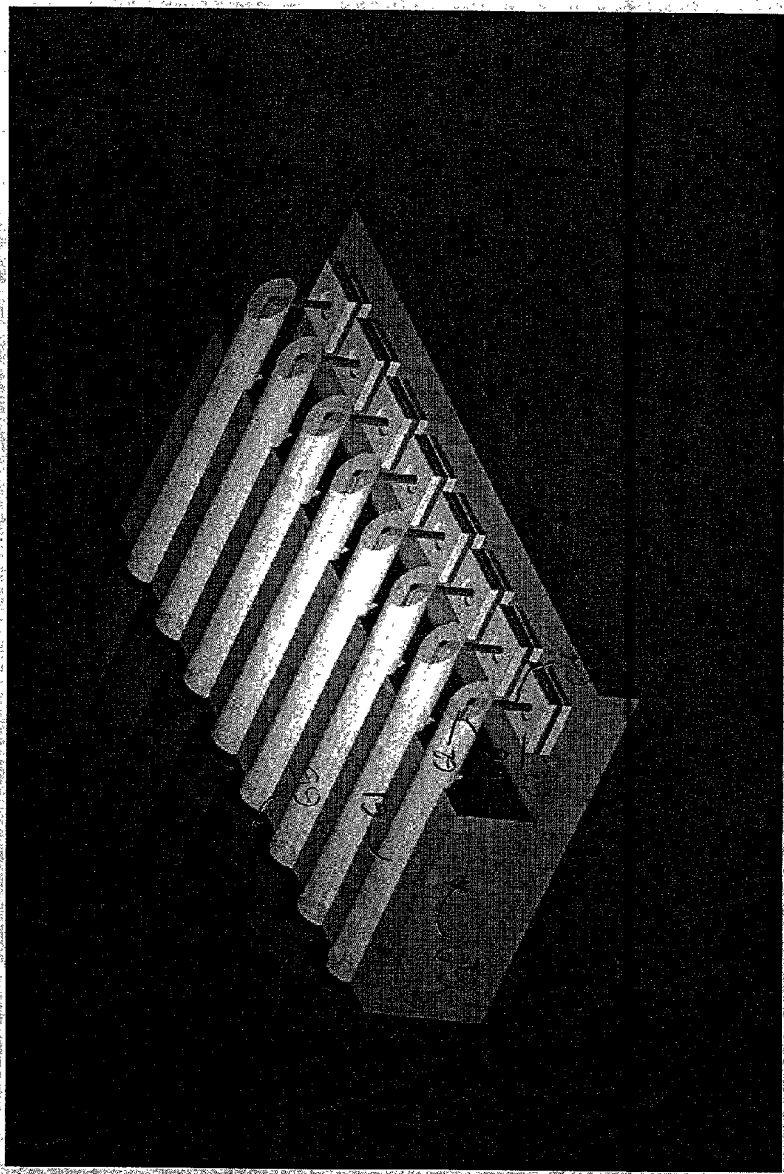
FIG. 6 shows a schematic of an optical subassembly comprising fibers of a ribbon cable optically coupled to an array of VCSELs.

Referring to FIG. 6, an optical subassembly 60 is shown comprising a plurality of fibers 61 arranged in a ribbon cable 65 and optically coupled to VCSELs 63, although the same configuration may be used to optically couple fibers to any device. The optical coupling is achieved by using the reflective properties of the end face 62. As shown, the end face angle is about 45° which reflects the light between the operative axis 64 of the VCSEL 63 and the optical axis 66 of the fiber 61 at about a right angle. The embodiment shown in FIG. 6 illustrates the versatility of the present invention and its ability to prepare the end faces of a plurality of fiber in a ribbon cable to couple with an array of VCSELS.

Figure 7:
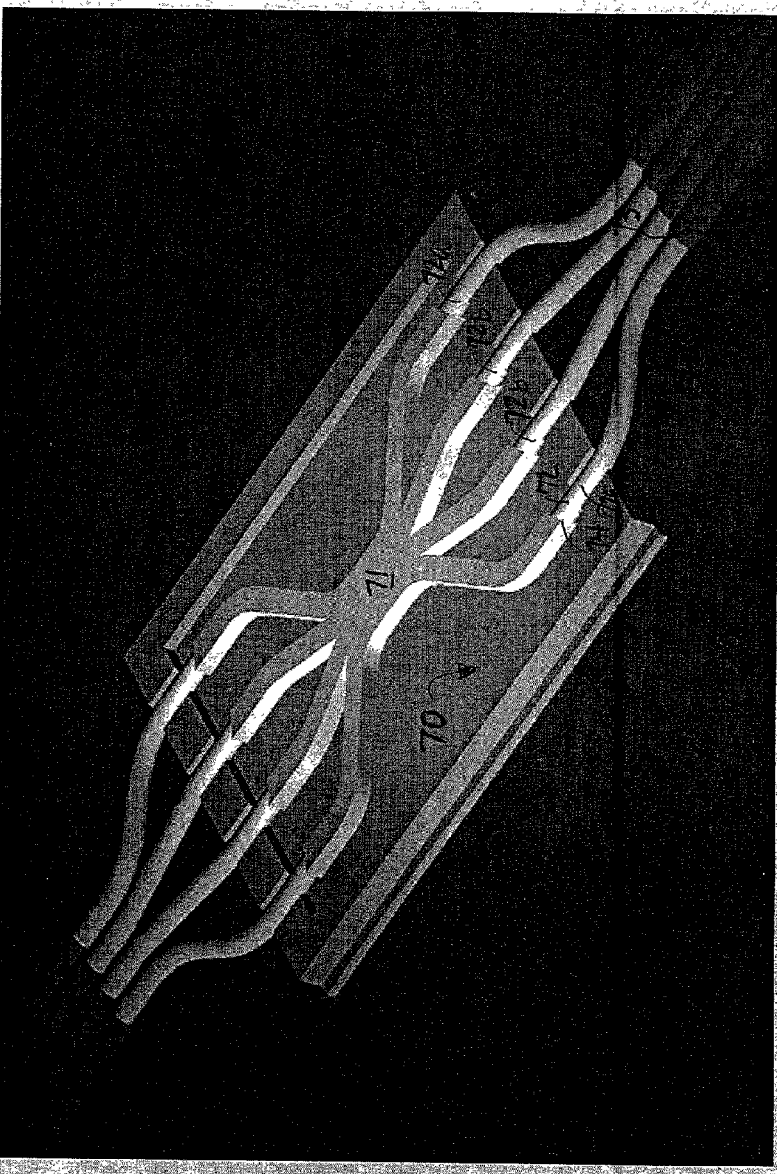
FIG. 7 shows a schematic of a planar component comprising fibers of a ribbon cable optically coupled to a planar waveguide.
Figure 7:
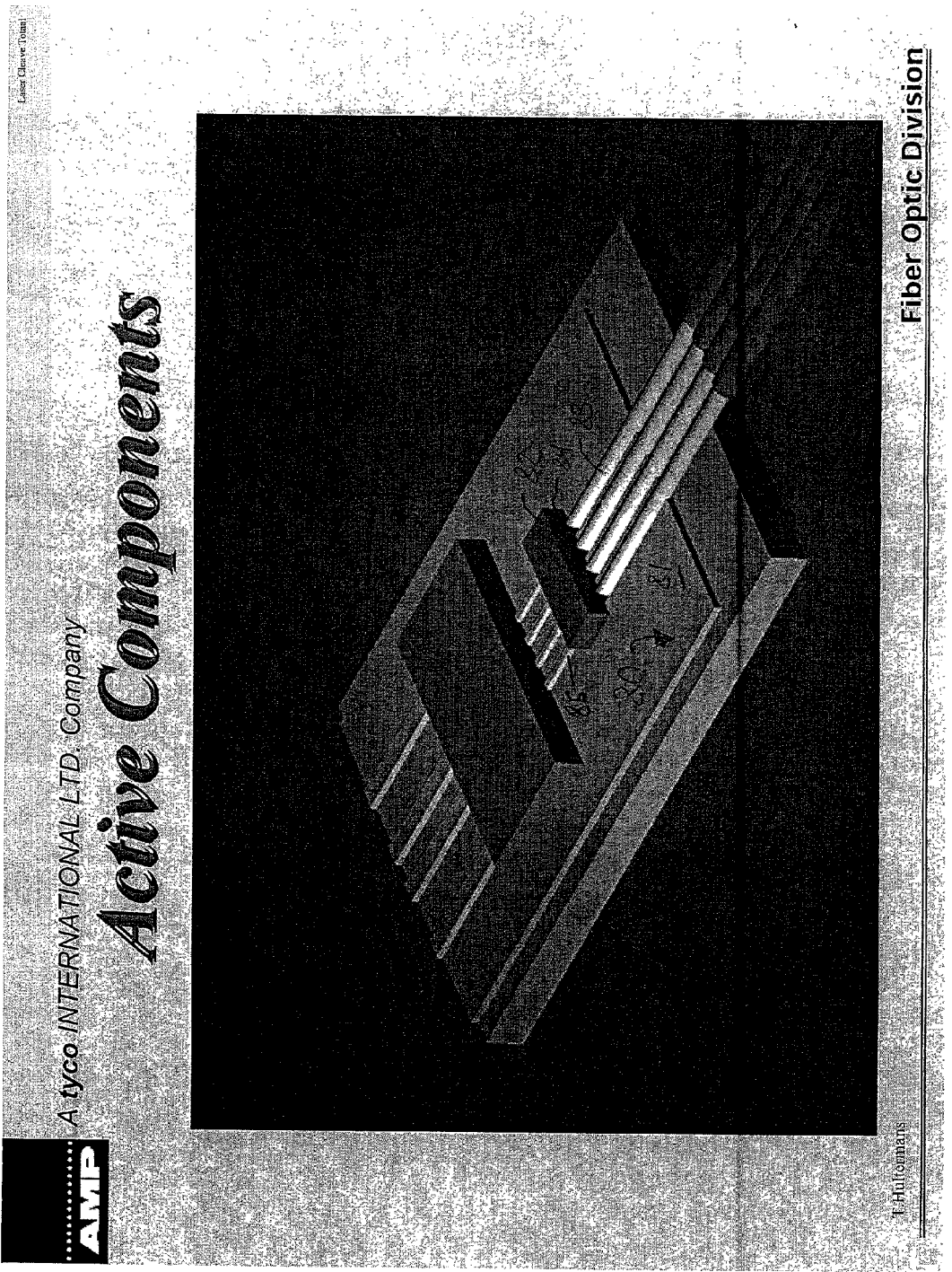

Referring to FIG. 7, a planar optic component 70 is shown comprising waveguide 71 integrated with fibers 72 having end faces 74 prepared according to the present invention. The fibers 72 are part of a ribbon cable 73 and yet have individually angled end faces 74 which could not have been prepared by simply cutting across the ribbon using a traditional mechanical cutting instrument. In a preferred embodiment, the end faces 74 are prepared by fanning the fibers out as they would be configured in the planar optical component, and then cleaving each fiber to a desired angle. This way, the specific lengths of the fibers—i.e., the long lengths of the exterior fibers 72*a* relative to the interior fibers 72*b*—and end face angles are addressed in a single operation.

Referring to FIG. 8. a silicon wafer platform 80 is shown comprising a substrate 85 having a number of V-grooves 81 and at least one active component 82 mounted thereon. A plurality of fibers 83 of a ribbon cable are aligned in the V-grooves 81 to optically couple with the component 82. Aside from facilitating individually angled fibers as mentioned above, the present invention provides for an improved end face for aligning in V-groove. Specifically, laser cleaving results in rounded edges along the perimeter of the fiber. The rounded edges have a tendency to glide along the V-groove as compared to sharp-edged end faces produced by mechanical fiber cleaving which tend to schrive the V-groove surface. This schriving kicks up or creates debris which may diminish the device's optical performance.

We claim:

1. A process for cutting at least one optical fiber, the process comprising the steps of:
   introducing a glass fiber into a holding and positioning device;
   actuating a laser device to deliver a beam having a power suitable for sublimating glass; and
   effecting the relative movement of said beam across said glass fiber along a path comprising two predetermined angles, thereby sublimating glass and cutting said glass fiber along said path to shape a wedge on the end face of the fiber.

2. The process according to claim 1, wherein said beam is a continuation wave.

3. The process according to claim 1, wherein said beam is pulsed.

4. The process according to claim 1, wherein the laser is a $CO_2$ laser.

5. A fiber prepared in accordance with the process of claim 1.

6. A process for cutting at least one optical fiber, the process comprising the steps of:
   introducing a glass fiber into a holding and positioning device;
   actuating a laser device to deliver a beam having a power suitable for sublimating glass; and
   effecting the relative movement of said beam across said glass fiber along a path having a predetermined angle, thereby sublimating glass and cutting said glass fiber along said path, said predetermined angle being repeatable within less than +/−0.5° at the core region.

* * * * *